(No Model.)

A. McDOWELL.
THILL COUPLING.

No. 325,428. Patented Sept. 1, 1885.

WITNESSES:
Theo. G. Hoster
C. Sedgwick

INVENTOR:
A. McDowell
BY Munn & Co
ATTORNEYS.

UNITED STATES PATENT OFFICE.

ALVEROW McDOWELL, OF HUDSON, INDIANA.

THILL-COUPLING.

SPECIFICATION forming part of Letters Patent No. 325,428, dated September 1, 1885.

Application filed May 28, 1885. (No model.)

*To all whom it may concern:*

Be it known that I, ALVEROW MCDOWELL, of Hudson, in the county of Steuben and State of Indiana, have invented a new and Improved Thill-Coupling, of which the following is a full, clear, and exact description.

The object of my invention is to provide a new and improved thill-coupling which is simple in construction, strong and durable, and does not rattle.

This invention consists in the combination, with a clip having jaws, of a bolt in the jaws, and of caps placed on the ends of the bolt and having angular arms which overlap between the jaws, and are held by a screw passed through them and resting against the thill-eye between the jaws.

Reference is to be had to the accompanying drawings, forming a part of this specification, in which similar letters of reference indicate corresponding parts in both the figures.

Figure 1:
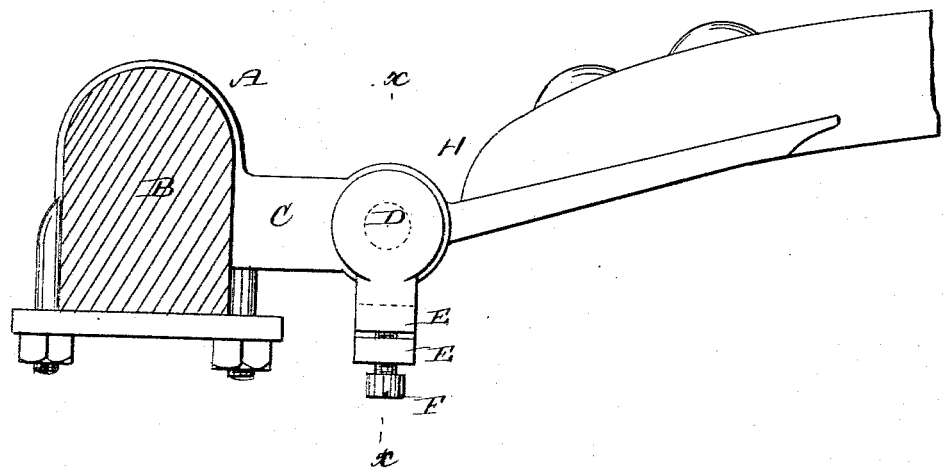
Figure 2:
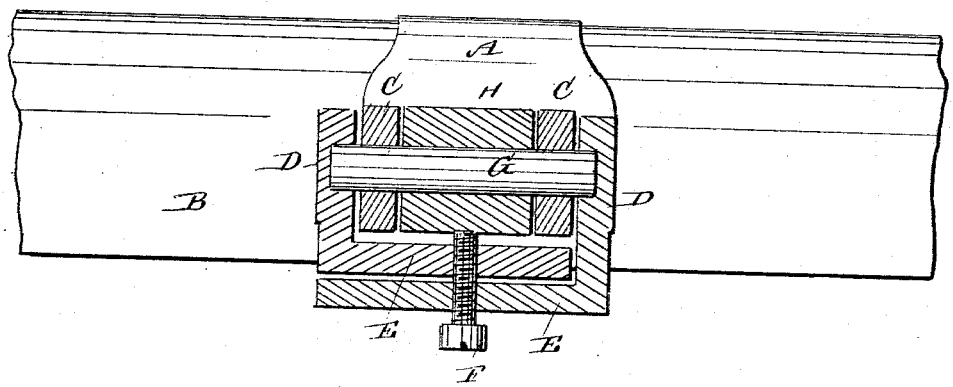

Figure 1 is a side view of my improved thill-coupling. Fig. 2 is a sectional view of the same on the line $x\ x$, Fig. 1.

The axle-clip A, held on the axle B, is provided with the two jaws C, in the ends of which the bolt G is held, the ends of which project beyond the outer sides of the jaws, the projecting ends of the bolt passing into recesses in the inner sides of caps D on the outer sides of the jaws, which caps have angular arms E, overlapping below the jaws. A smooth aperture is formed in the lower arm E, and a threaded aperture in the upper or inner arm E, and through the said apertures a screw, F, is passed, the inner end of which rests against the thill-eye H, placed between the jaws, and through which thill-eye the bolt G is passed.

The screw F is drawn up tightly and prevents the parts from rattling, and at the same time holds the arms E and the caps D in place, thus preventing the bolt G from working loose.

Having thus fully described my invention, I claim as new and desire to secure by Letters Patent—

1. The combination, with the clip A, having the jaws C, of the bolt G, projecting through and from the outer sides of the jaws, the caps D, having angular arms E, which overlap, and the screw F, passed through the overlapping arms and resting against the thill-eye between the jaws, substantially as herein shown and described.

2. The combination, with an axle-clip, of the bolt G, the caps D, the overlapping arms E, and the set-screw F, substantially as herein shown and described.

ALVEROW McDOWELL.

Witnesses:
FRANK C. HAMILTON,
JOHN H. WAGNER.